(12) United States Patent
Geissinger et al.

(10) Patent No.: US 10,970,275 B2
(45) Date of Patent: Apr. 6, 2021

(54) SYSTEM AND METHODS FOR PROVIDING A DATA STORE HAVING LINKED DIFFERENTIAL DATA STRUCTURES

(71) Applicant: SAP SE, Walldorf (DE)

(72) Inventors: Steffen Geissinger, Weisloch (DE); Christian Bensberg, Heidelberg (DE)

(73) Assignee: SAP SE, Walldorf (DE)

( * ) Notice: Subject to any disclaimer, the term of this patent is extended or adjusted under 35 U.S.C. 154(b) by 272 days.

(21) Appl. No.: 16/009,779

(22) Filed: Jun. 15, 2018

(65) Prior Publication Data
US 2019/0384841 A1 Dec. 19, 2019

(51) Int. Cl.
*G06F 16/23* (2019.01)
*G06F 16/93* (2019.01)

(52) U.S. Cl.
CPC .......... *G06F 16/2379* (2019.01); *G06F 16/93* (2019.01)

(58) Field of Classification Search
CPC ........ G06F 16/23; G06F 16/93; G06F 16/219; G06F 16/22; G06F 16/2379
See application file for complete search history.

(56) References Cited

U.S. PATENT DOCUMENTS

| | | | | |
|---|---|---|---|---|
| 5,892,513 A | * | 4/1999 | Fay | G06F 16/93 715/854 |
| 6,014,674 A | * | 1/2000 | McCargar | G06F 16/284 |
| 8,862,639 B1 | * | 10/2014 | Rao | G06F 16/219 707/813 |
| 2017/0364701 A1 | * | 12/2017 | Struttmann | G06F 16/2282 |
| 2019/0130121 A1 | * | 5/2019 | Birn | G06F 16/211 |
| 2019/0138587 A1 | * | 5/2019 | Silk | G06F 40/197 |

* cited by examiner

*Primary Examiner* — Matthew J Ellis
(74) *Attorney, Agent, or Firm* — Buckley, Maschoff & Talwalkar LLC

(57) ABSTRACT

A data storage and retrieval system for a computer memory configured according to a document store adapted to contain documents. The document store includes a document data structure containing a header and a document having one or more members. The document store further includes a chain of one or more differential data structures, each having a header and at least one updated member. The updated member has a value which is updated relative to a value in a corresponding member having a same identifier in the document data structure or in a preceding differential data structure in the chain. A header of each of the differential data structures includes a pointer to the document data structure or the preceding differential data structure in the chain, and a flag indicating that each of the differential data structures contains less than all of the members of the document data structure.

15 Claims, 9 Drawing Sheets

{"name": "joe"}

| 0 | SIZE | S4 | name | S | 3 | joe |
|---|------|----|----|---|---|-----|
| 1b | 4b | 1b | 4b | 1b | 1b | 3b |

FIG.2A

{"error": true, "code": 25}

| 0 | SIZE | S5 | error | T | S4 | code | U | 25 |
|---|------|----|-----|---|----|----|---|----|
| 1b | 4b | 1b | 5b | 1b | 1b | 4b | 1b | 1b |

FIG.2B

```
"name": "Joe",
"age" : 25,
"hobbies": ["soccer", "swimming"],
"address": {
    "street": "4 Pennsylvania Plaza",
    "city": "New York"
    ~
}
~
```

FIG.3A

```
0    name
1    age
2    hobbies
3    address
4    street
5    city
```

FIG.3B

```
{
    0: "Joe",
    1: 25,
    2: ["soccer", "swimming"],
    3: {
            4: "4 Pennsylvania Plaza",
            5: "New York"
       }
}
```

FIG.3C

SYSTEM AND METHODS FOR PROVIDING A DATA STORE HAVING LINKED DIFFERENTIAL DATA STRUCTURES

FIELD OF THE INVENTION

The disclosed embodiments are directed to providing a data store with chains of linked differential data structures for storing updated data.

BACKGROUND

A document database, also referred to as a document store, differs significantly from a traditional relational database. Relational databases generally store data in separate tables with a strict layout that is pre-determined by application developers. Often a piece of data, i.e. a "data object", may be spread across several tables (i.e., "normalization"). Meanwhile, document databases can store all information for a given object in a single unit, in just one database artifact, and each stored object can differ from other stored objects. In other words, there may be no internal structure that maps directly onto the concept of a table, and the fields and relationships generally don't exist as predefined concepts. Instead, all of the data for an object is placed in a single document, and stored in the document database as a single entry. The structure or layout of the document is part of the stored data itself. This is being referred to as semi-structured. With a document store, there is no need to transform objects into a relational model ("object-relational mapping"). Accordingly, a document store is attractive in applications that are handling semi-structured data. A typical use case is storing JSON documents (JavaScript Object Notation) which is often used in web applications or in application that are subject to continual change in place, and where speed of deployment is an important issue. If only one field of a document is updated, the entire document may be duplicated into a new version, which is updated and stored in memory. Copying this amount of data, allocating sufficient memory, and storing the updated version may result in a relatively long time being required to perform the update operation.

SUMMARY

In one aspect, the disclosed embodiments provide a data storage and retrieval system for a computer memory, and a corresponding method and computer-readable medium storing instructions to execute the method. The system includes a processor programmed to configure the computer memory according to a document store adapted to contain one or more documents. The document store includes a document data structure comprising a header and a document of the one or more documents. The document includes one or more members, each member having an identifier and a value. The document store further includes a chain of one or more differential data structures, each comprising a header and at least one updated member. The updated member has a value which is updated relative to a value in a corresponding member having a same identifier in the document data structure or in a preceding differential data structure in the chain. A header of each of the differential data structures includes a pointer to the document data structure or the preceding differential data structure in the chain, and a flag indicating that each of the differential data structures contains less than all of the members of the document data structure.

Embodiments may include one or more of the following features.

The document store may further include a cache associated with the document data structure, the cache including the members of the document. The cached members may be updated correspondingly with addition of each differential data structure to the chain. A header of a most recent one of the differential data structures may have a pointer to the cache and, if the most recent differential data structure is visible to a transaction, a version of the document may be produced by retrieving the cached members. If a most recent differential data structure is not visible to a transaction, the chain of differential data structures may be traversed based on the pointers in the differential data structures until the document data structure is reached. A version of the document may be produced by updating the members in the document data structure based on the at least one updated member in the chain of differential data structures, up to and including a most recent differential data member which is visible to the transaction. The document data structure and at least a portion of the chain of differential data structures may be replaced with a new version of the document data structure by updating the members in the document data structure based on the at least one updated member in the chain of differential data structures, up to and including a most recent differential data member which is visible to all transactions.

The computer memory may be further configured to include a dictionary containing one or more identifiers, each of the identifiers being associated in the dictionary with a value ID. The document data structure may include at least a first column, the first column being associated with a first identifier of the one or more identifiers. The first column may include: a value ID of the first identifier, one or more document IDs identifying documents which contains the first identifier, and a set of values associated with the first identifier in the identified documents.

BRIEF DESCRIPTION OF THE DRAWINGS

FIGS. 2A and 2B are examples of data structure diagrams showing JSON data stored as binary data;

FIG. 3A depicts an example document containing JSON data;

FIG. 3B depicts a dictionary for use with the JSON data of FIG. 3A;

FIG. 3C depicts the document of FIG. 3A with the JSON data compressed using the dictionary of FIG. 3B;

DETAILED DESCRIPTION

Figure 1:
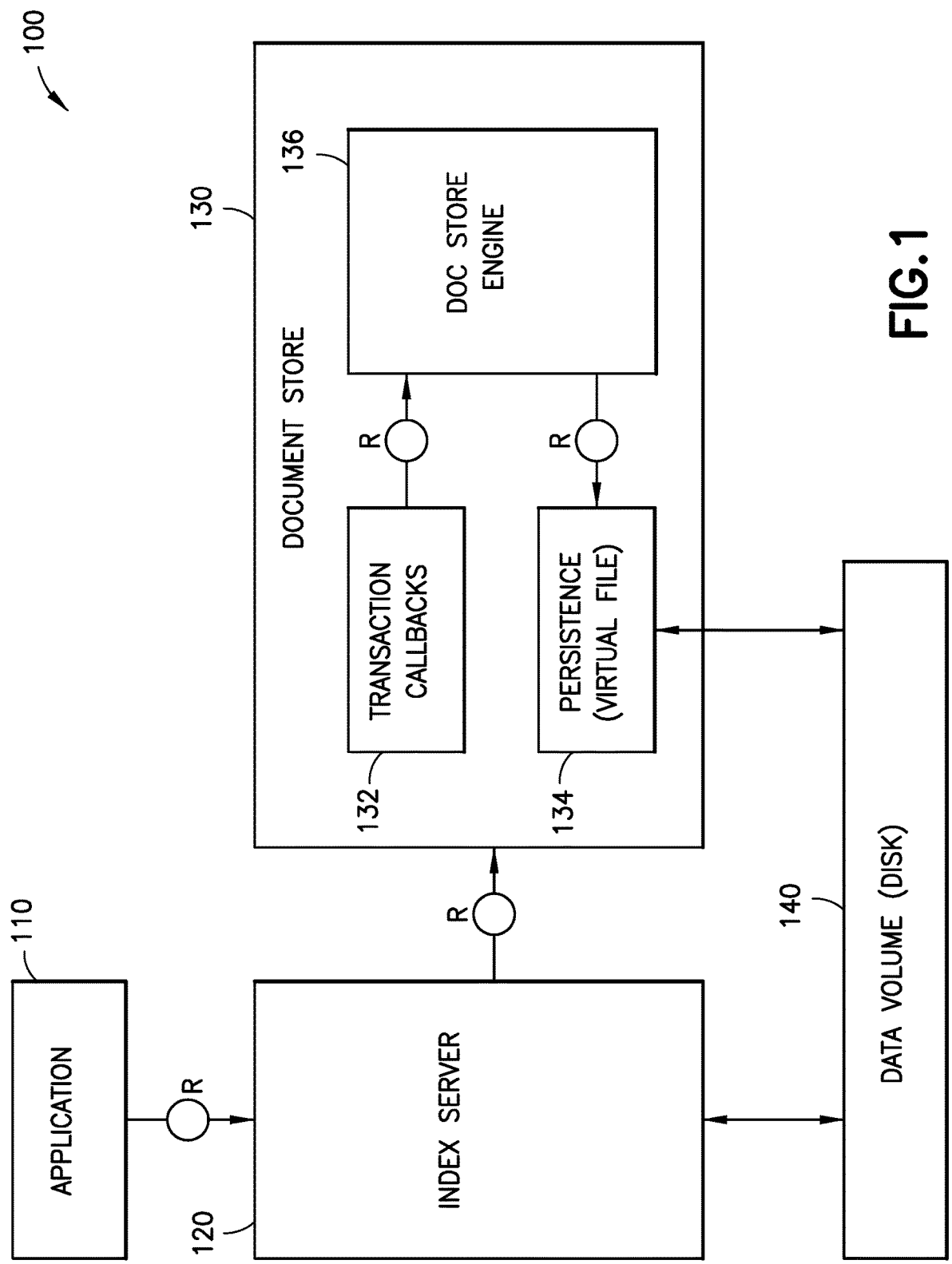
FIG. 1 is a block diagram of a database computing architecture including a document store.

FIG. 1 is a block diagram of a database computing architecture including a document store (referred to as "DocStore"), which is a store for JavaScript Object Notation (JSON) artifacts and which allows native operations on JSON, including filtering, aggregation, and joining JSON documents with column or row store tables. JSON documents are stored in so-called "collections." The content of a JSON document may be deeply structured but has no static schema. This means that any valid JSON data may be inserted without first declaring its structure.

The architecture 100 includes an application 110 that interacts with an index server 120 for processing client/application requests. The index server 120 manages a document store 130 which may be an in-memory data structure such as dynamic random access memory (DRAM) or the like storing client data. The index server 120 and the document store 130 may both store data to disk 140. For example, the document store 130 may store checkpoints to disk 140, in response to the system requesting a checkpoint operation.

The database computing architecture 100 may be incorporated within a database system such as an in-memory, column-oriented, relational database management system that functions as a database server to store and retrieve data as requested by software applications. The database system may combine both online analytical processing (OLAP) and online transaction processing (OLTP) operations into a single system. The database system may store data in main memory (e.g., document store 130) rather than on disk 140 which provides for faster data access, and by extension, faster querying and processing. The document store 130 may be provided in addition to other types of storage architectures, such as, for example, a column store and a row store (not shown). In disclosed embodiments, the document store 130 is an independent store which interacts with either of the column store and the row store for data storage.

In disclosed embodiments, the index server 120 may perform session management, authorization, transaction management and command processing.

Although shown as separate components in the example of FIG. 1, in some cases, the index server 120 may include the document store 130 as the engines for processing the data. The client application 110 may submit structured query language (SQL) and multidimensional expression (MDX) statements to the index server 120 in the context of authenticated sessions and transactions which may be executed on data included in the document store 130 as well as other data stores. The index server 100 also manages persistence between cached memory images of database objects, log files and permanent storage files.

An application 110 provided by a user may perform operations on the database. Connection and session management processes may be performed by the index server 120 to create and manage database clients and the corresponding applications such as the user's application 110. Once a session is established, the application 110 can communicate with the database using SQL statements, for example. For each session, a set of parameters may be maintained such as auto-commit, current transaction isolation level, etc. Also, users may be authenticated either by the database itself (e.g., login with username and password) or authentication may be delegated to an external authentication provider, such as an LDAP directory.

In disclosed embodiments, client requests (e.g., requests originating from the application 110) are analyzed and executed by the index server 120. For example, incoming SQL requests may be routed to an SQL processor of the index server. Data manipulation statements may be executed by the SQL processor. As another example, other types of requests may be delegated to other components. For example, data definition statements may be dispatched to a metadata manager, transaction control statements may be forwarded to a transaction manager, planning commands may be routed to a planning engine and procedure calls may be forwarded to a stored procedure processor. An SQL statement may be processed in the context of a transaction. New sessions may be implicitly assigned to a new transaction. The transaction manager may coordinate database transactions, controls transactional isolation and keeps track of running and closed transactions. When a transaction is committed or rolled back, the transaction manager informs the involved engines (e.g., document store 130, column store, row store, etc.) about this event so they can execute necessary actions. The transaction manager also cooperates with a persistence layer of the index server to store data to disk 140 to achieve atomic and durable transactions.

In disclosed embodiments, the index server 120 may provide a metadata manager component. The metadata may include a variety of objects, such as, for example, definitions of relational tables, columns, views, indexes and procedures. Metadata of all these types may be stored in one common database catalog for all stores. The database catalog may be stored as tables in a row store. The features of the database, such as transaction support and multi-version concurrency control, are also used for metadata management.

The index server 120 may support a number of data stores of different types (i.e., having different engines) such as a document store 130, a column store, and a row store, and the like. As described herein, a store is a sub-system of the database which includes in-memory storage, as well as the components which manage the storage. For example, a row store may be a database row-based in-memory relational data engine. Meanwhile, a column store may store tables column-wise. The document store 130 (also referred to as a JSON document store) may store documents in the form of collections. The need to store unstructured data such as social media, multimedia, etc. has grown rapidly. SQL meanwhile requires structure to be specified in advance which means that any changes to the information schema require time-consuming alter statements to run on a table. The document store 130 overcomes this issue by loosening the restrictions on database schema and allows data to be grouped together more logically and naturally. In the document model, each record and its associated data is through of as a "document."

In the document store 130, all data related to a database object is encapsulated together. As a result, documents are independent units which make performance better and make it easier to distribute data across multiple servers while preserving locality. Furthermore, application logic is easier to write because no translation is needed between objects in an application and SQL queries. Rather, the object model can be turned directly into a document. Also, unstructured data can be stored easily since a document may contain whatever keys and values the application logic requires. The callback transaction layer 132 may receive requests from the index server 120 and process those requests on content stored in the document store engine 136.

The document store 130 may also include a persistence layer 134 which provides data persistency to disk 140. Like a traditional database, page management and logging may be performed by the persistence layer 134. According to various embodiments, the changes made to the in-memory database pages may be persisted through checkpoints. Checkpoints may be written to data volumes on the persistent storage 140 for which the storage medium is hard drives. All transactions committed in the database are stored/saved/referenced by a logger 134 of the persistence layer 134 in a log entry written to the disk 140 on the persistent storage. To get high I/O performance and low latency, log volumes may use flash technology storage. Furthermore, the persistence layer 134 is responsible for durability and atomicity of transactions. This layer ensures that the database is restored to the most recent committed state after a restart or other loss and that transactions are either completely executed or completely undone. To achieve this in an efficient way, the persistence layer 134 uses a combination of checkpoints and logs.

FIGS. 2A and 2B are data structure diagrams showing JSON data stored as binary data. JavaScript Object Notation (JSON) is an open-standard file format that uses human-readable text to transmit data objects including attribute—value pairs and array data types (or any other serializable value). JSON's basic data types are: Number (e.g., a signed decimal number); String (e.g., a sequence characters delimited with double-quotation marks); Boolean (either of the values true or false); Array (an ordered list of zero or more values, each of which may be of any type—Arrays use square bracket notation and elements are comma-separated); Object (an unordered collection of name—value pairs where the names, also called "keys" or "identifiers," are strings—Objects are delimited with curly brackets and use commas to separate each pair, while within each pair the colon character separates the key or name from its value; Null (an empty value, using the word "null"). JSON documents are delimited by a pair of curly brackets (i.e., braces) as the outermost characters. FIGS. 3A and 3C show JSON documents that are formatted with line breaks and tabs for easier readability. Whitespace does not change the semantics of a document.

In the first example data structure 210, depicted in FIG. 2A, an object 215 having the identifier 220 "name" and the value 225 "joe" is stored in binary form. The first field 230 (1 byte) of the data structure is the data type, which in this example is "0" for object. The second field 235 (4 bytes) is the size of the data structure, i.e., the size of the data structure of the entire object. The third field 237 (1 byte) is the size of the identifier. Because the first element of an object is always an identifier 220, which is always a string, it not necessary to separately indicate the data type of the identifier 220. Therefore, "S4" may be used to indicate that the string has a size of four characters. The fourth field 240 (4 bytes) is the identifier 220, "name". The fifth field 242 (1 byte) is the data type of the value 225 which is paired with the identifier 220 "name". In this example, the value 225 ("joe") is a string ("S"). The sixth field 244 in this example (1 byte) is the size of the value, which is three characters. The seventh field 246 in this example is the value 225, which is a string: "joe". The string value is directly stored as part of the binary JSON data.

In the second example data structure 250, depicted in FIG. 2B, an object 255 having two identifier—value pairs is stored in binary form: a first pair with "error" as the identifier 252 and "true" as the value 254; and a second pair with "code" as the identifier 256 and the unsigned integer 25 as the value 258. The first field 260 (1 byte) of the data structure 250 is the data type, which in this example is "0" for object. The second field 262 (4 bytes) is the size of the data structure, i.e., the size of the data structure of the entire object. The third field 264 (1 byte) is the size of the identifier 252 of the first identifier—value pair, e.g., "S5," which indicates that the identifier 252 ("error") has a size of five characters (the identifier always being a string). The fourth field 266 (5 bytes) is the identifier 252, "error". The fifth field 268 (1 byte) is the value 254 of the first identifier—value pair, which is a boolean value, "T" (a data type being unnecessary, as it can be inferred from the value). The sixth field 270 (1 byte) is the size of the identifier 256 of the second identifier—value pair, e.g., "S4," which indicates that the identifier 256 ("code") has a size of four characters (the identifier always being a string). The seventh field 272 (4 bytes) is the identifier 256, "code". The eighth field 274 (1 byte) is the data type of the value 258, which is "U" for unsigned integer. The ninth field 276 (8 bytes) is the value 258, which is the unsigned integer 25 (a size being unnecessary, as it can be inferred from the data type).

FIGS. 3A-3C depict an example document containing JSON data which is compressed using a dictionary. The document includes the identifiers: "name" (which has a string as its value), "age" (which has an unsigned integer as its value), "hobbies" (which has an array as its value), and "address" (which has a nested object as its value). The nested object which is the value associated with the "address" identifier has two identifier—value pairs: "street" (which has a string as its value) and "city" (which has a string as its value). Thus, there is a total of six identifiers contained in the example document.

As shown in FIG. 3B, the identifiers are included in a dictionary in which each identifier has a corresponding lookup value (e.g., 0, 1, 2, 3, etc.). FIG. 3C shows the JSON document of FIG. 3A stored in a compressed format in which the identifiers have been replaced by their corresponding dictionary lookup values. The lookup values each require only one byte to be stored in the data structure of the document, as opposed to a byte for each character of the identifier string. This results in a significantly smaller size for the document as a whole.

Figure 4:
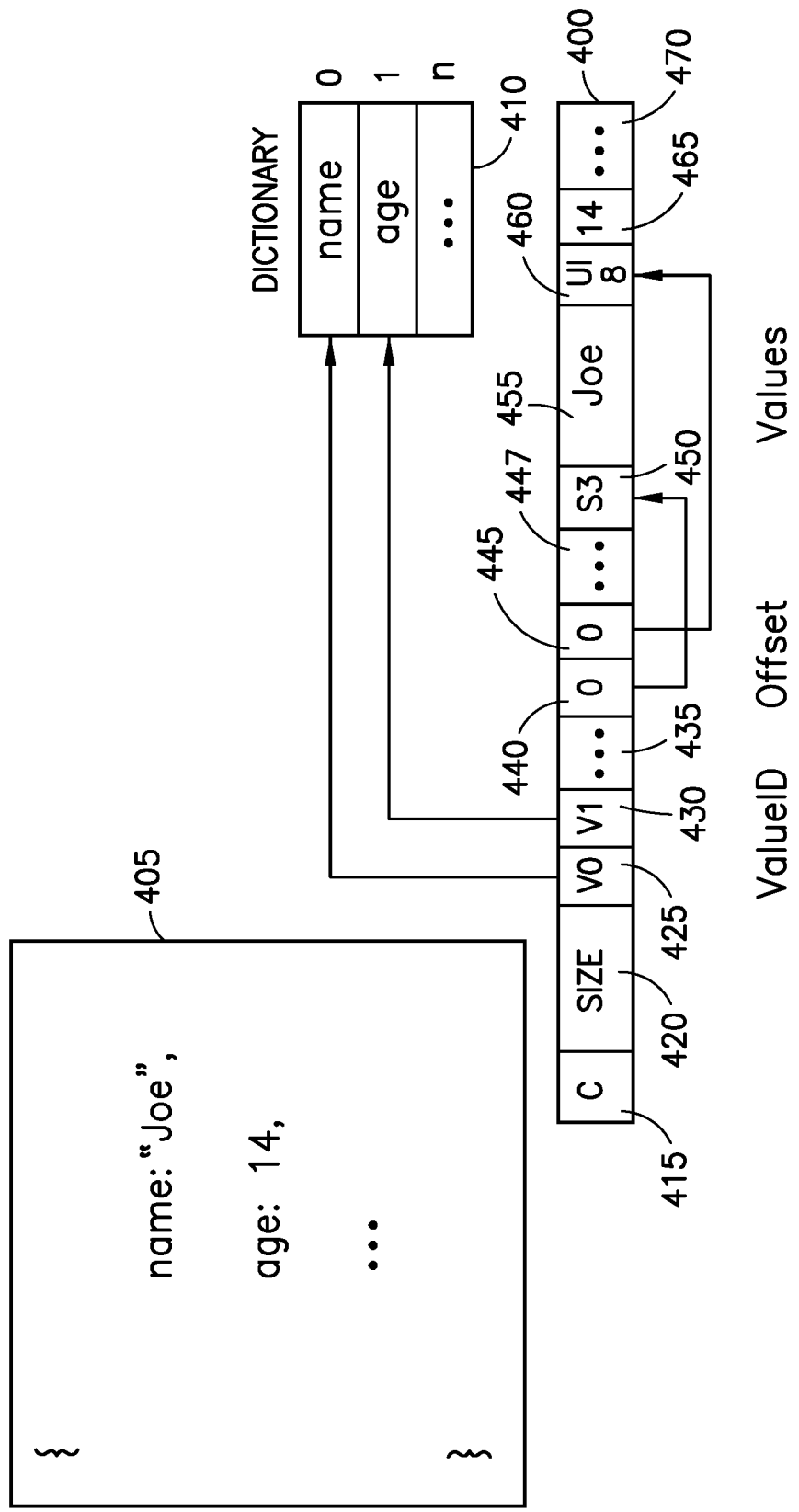
FIG. 4 is a data structure diagram showing a document containing JSON data stored as binary data compressed using a dictionary.

FIG. 4 is a data structure 400 diagram showing a document 405 containing JSON data stored as binary data compressed using a dictionary 410. The data structure 400 stores the entire document 405 in consecutive data locations and is therefore considered to be row storage of the document 405. The first field 415 of the data structure 400 indicates a "Compressed Object". The second field 420 is the size of the data structure 400, i.e., the size of the data structure of the entire object. The third field 425 is the valueID of the identifier of the first identifier—value pair, i.e., the value "V0," which indicates that the first identifier ("name") is the first entry in the dictionary 410 of identifiers. The fourth field 430 is the valueID of the identifier of the second identifier—value pair, i.e., the value "V1," which indicates that the second identifier ("age") is the second entry in the dictionary 410. This may be followed by additional valueID fields 435 for additional identifiers contained in the document 405.

The valueID fields (425, 430 and 435) are followed by a number of offset fields (440, 445, and 447) (1 byte) which point to the relative location in the data structure 400 of the value of each identifier—value pair of the document, e.g., by providing a number of bytes between the offset field and the value to which the offset field is pointing. In the example depicted, the offset 440 of the value of the first identifier—value pair ("Joe") is the relative location, e.g., in bytes, of the position in the data structure 400 where the value is stored. The first byte 450 of the storage position of the first value indicates the data type and size of the first value, e.g., "S3," which indicates that the value ("Joe") is a string having a size of three characters. This is followed by the stored first value itself 455, which in this case occupies three bytes of the data structure. The offset 445 corresponding to the value of the second identifier—value pair (i.e., 14) points to a location in the data structure 400 which follows the stored value of the first identifier—value pair. The first byte 460 of this location indicates the data type and size of the second value, e.g., "U18," which indicates that the value (14) is an unsigned integer (which implicitly has a size of, e.g., eight bytes). This is followed by the stored second value itself 465. The offsets 447 of additional identifier—value pairs follow in the same portion of the data structure as the offsets of the first and second pairs (440 and 445). The identifiers and values of additional identifier—value pairs would be stored in subsequent locations 470 in the data structure 400.

Figure 5:
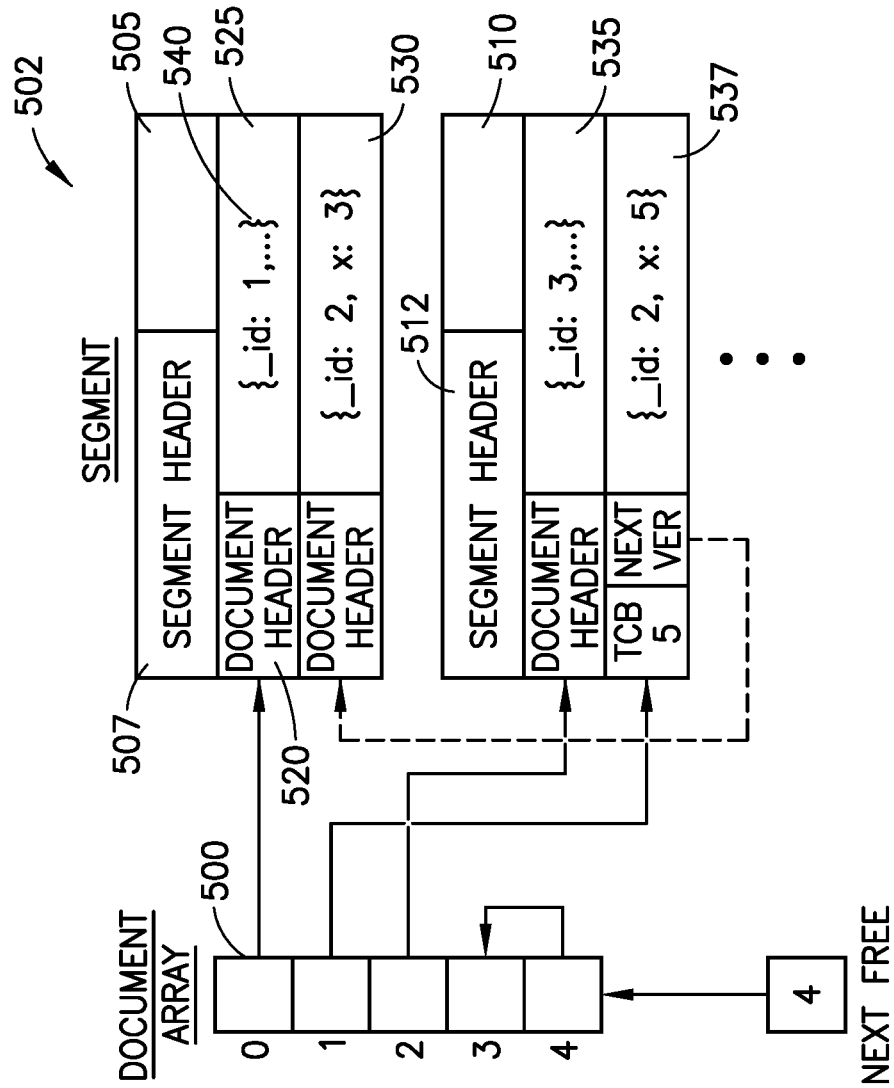
FIG. 5 is a diagram depicting a memory slice which includes an array referencing documents stored in segments.

FIG. 5 is a diagram depicting a memory slice which includes a document array 500 (i.e., document vector) referencing documents stored in segments (505 and 510) which are referenced by an index 515. The document array 500 may reference documents stored in a number of segments (505 and 510), each having a segment header (507 and 512). Each stored document in the segment has a document header 520 to identify the locations in the data structure 502 occupied by the document. The segment data structure 502 may store the entire document in consecutive data locations of memory.

In the example depicted, document 1 (525) is stored in the first segment 505, document 2 (530) is also stored in the first segment 505, document 3 (535) is stored in the second segment 510. An newer version of document 2 (537) is also stored in the second segment 510 and refers to the next version (i.e., earlier version) of itself stored as document 2 (530) in the first segment 505. Following its respective header 520, each document includes one or more members 540, e.g., an identifier—value pair with the identifier "x" and a corresponding value.

Each document stored in the segments (515 and 520) has a header and may refer to transaction control block (TCB) 550, which may change as transactions are performed. For example, if there is a COMMIT operation (i.e., an operation marking a transaction as atomically committed in the persistent storage), such an operation marks a document as committed, which means that the document vector 510 points to the document header, but its associated transactional information changes. In the case of an UPDATE operation, there is a chain, e.g., a linked list, of operations which uses the real memory address stored in the document header (the header including the link to TCB 5 and the "Next Ver" link) to jump to memory locations for the version of the document which is needed.

Figure 6A:
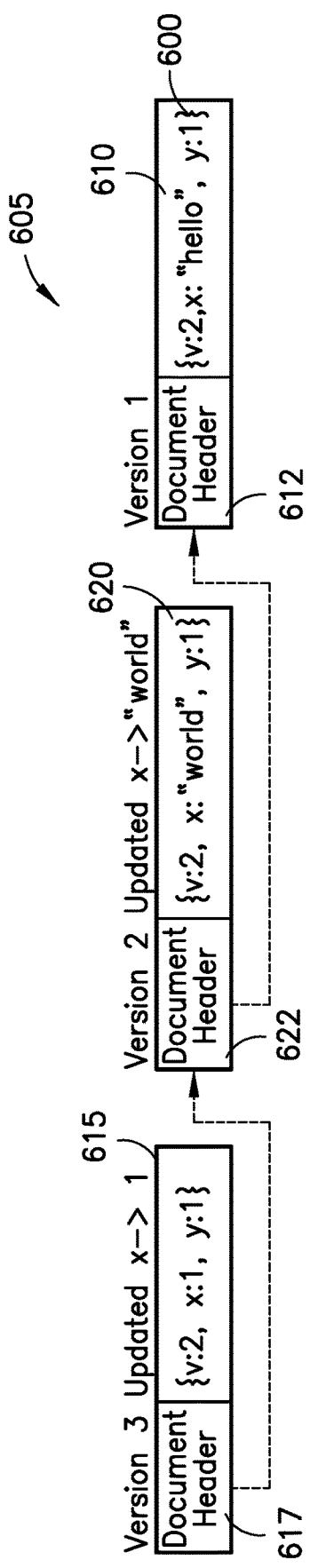
FIG. 6A is a data structure diagram showing a chain of updated versions of a document in which each version includes a full copy of the document.

FIG. 6A is a diagram of a data structure 605 having a chain of updated versions (615 and 620) of a document 600 in which each version includes a full updated copy of the document 600. In this example, the document 600 includes three members, e.g., three identifier—value pairs, with the identifiers being v, x, and y. Each version (610, 615, and 620) of the document 600 includes a header (612, 617, and 622) which contains a pointer to, i.e., a memory address of, the next most recent version. In version 1 (610) of the document, which is the oldest version, the identifier "x" has an associated value—the string "hello". Subsequently, a new version of the document, version 2 (620), is created through an UPDATE operation in which the value associated with "x" is updated to the string "world". Version 2 (620) of the document includes a document header 622 with a pointer to, e.g., a memory address of, version 1 (610). In this example, version 2 (620) includes the same members as version 1 (610), including the members which have not been updated (e.g., "v" and "y") and the member which has been updated, "x". Thus, version 2 (620) may be said to be a full update version of version 1 (610) of the document 600.

A subsequent UPDATE operation may create a new version, version 3 (615), of the document. In version 3 (615), the value associated with identifier "x" has been updated to a numerical value of 1. Version 3 (615) of the document includes a document header 617 with a pointer to, e.g., a memory address of, version 2 (620) of the document. In this example, version 3 (615) includes the same members as version 2 (620), including the members which have not been updated (e.g., "v" and "y") and the member which has been updated, "x". Thus, version 3 (615) may be said to be a full update version of version 2 (620) of the document.

In the example of FIG. 6A, the "x" field of the document 600 was updated from "hello" to "world," which resulted in an entire new version, i.e., version 2 (620), of the document being stored somewhere in memory. These versions (610 and 620) are linked together via a pointer in a document header 622 of the newer version, i.e., version 2 (620), of the document. This was followed by another update in which the "x" field was updated to a numerical value, e.g., an unsigned integer, 1. Again, an entire new version, i.e., version 3 (615), of the document was created, stored in memory, and linked to the earlier version via a pointer in the document header 617 of the newly created version, i.e., version 3 (615). Upon completion of each of the UPDATE operations, the document array (see, e.g., FIG. 5, ref. no. 500) points to newest version of the document. In this embodiment, even if only one field of a document is updated, the entire document is duplicated into a new version, which is updated and stored in memory. Consequently, if a document is, e.g., 30 MB in size, and only a small portion, e.g., 5 bytes, is updated, the entire 30 MB must be copied and stored in memory. Copying this amount of data, allocating the memory, and storing the updated version may result in a relatively long time being required to perform the update operation. This could be disadvantageous for update-heavy workloads.

Figure 6B:
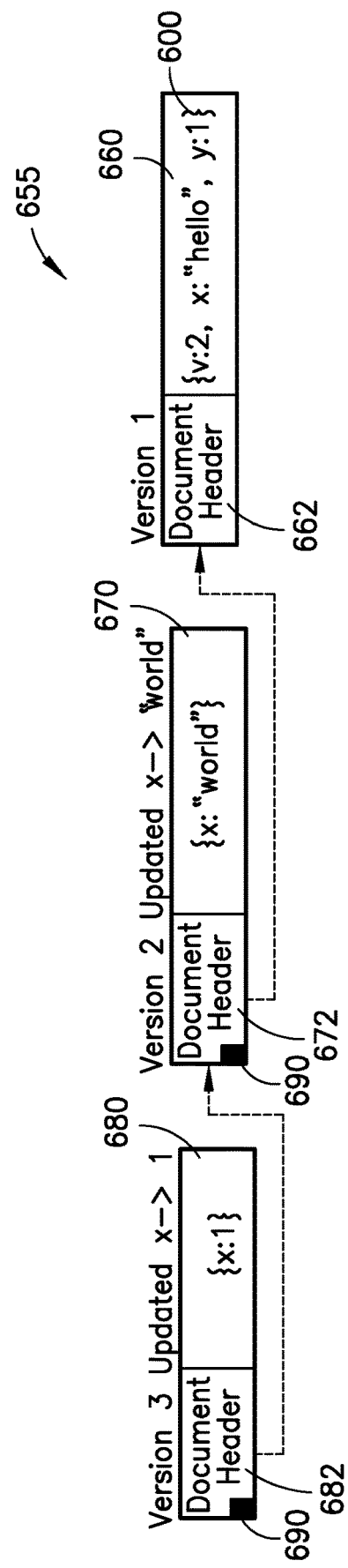
FIG. 6B is a data structure diagram showing a chain of updated versions of a document in which one or more versions are delta versions including only the members which have been updated relative to a base version which includes a full copy of the document.

FIG. 6B is a diagram of a data structure 655 having a chain of updated versions (660, 670, and 680) of a document 600 in which one or more versions are delta versions including only the members which have been updated relative to a base version, e.g., version 1 (660), which includes a full copy of the document. In version 1 (660) of the document, which is the oldest version, the identifier "x" has an associated value—the string "hello". Subsequently, a new version of the document, version 2 (670), is created through an UPDATE operation in which the value associated with "x" is updated to the string "world". Version 2 (670) of the document includes header 672 with a pointer to, e.g., a memory address of, version 1 (660). However, in this example, version 2 (670) includes only the member which has been updated, "x," and does not include the members which have not been updated (e.g., "v" and "y"). Thus, version 2 (670) may be said to be a delta update version of version 1 (660) of the document.

A subsequent UPDATE operation may create a new version, version 3 (680), of the document. In version 3 (680), the value associated with identifier "x" has been updated to a numerical value of 1. Version 3 (680) of the document includes a header 682 with a pointer to, e.g., a memory address of, version 2 (670). In this example, version 3 (680) includes only the member which has been updated from version 2 (670), "x," and does not include the members which have not been updated (e.g., "v" and "y"). Thus, version 3 (680) may be said to be a delta update version of version 2 (670) of the document.

In the example of FIG. 6B, it is only necessary to store only the updated fields. Therefore, much less space is required to store the updated document versions. For example, if the updated portion of a document is 10 bytes, then it is only necessary to store 10 bytes plus a header, which may be, e.g, 64 bytes in total, instead of duplicating an entire document of several MB or larger. In disclosed embodiments, a flag 690 is included in the document headers (672 and 682) to distinguish delta update versions, e.g., version 2 (670) and version 3 (680), from full update versions, e.g., version 1 (660). This allows a chain of versions to be traversed by a process and when a delta update version is read, the process is informed by the flag 690 that a previous version must also be read and merged to form a full, i.e., complete, version of the document, In disclosed embodiments, a delta update version of a document may contain multiple updated fields, e.g., an update to field "x" and field "y".

In general, database transactions occur over time. In disclosed embodiments, when an initial read operation occurs for a transaction, the transaction is assigned a timestamp which may be referred to as a "read timestamp". The timestamp may be an incremental counter value received from a transaction manager or other program executing on the database, as opposed to a clock time received from a system clock. When a transaction is subsequently committed to the database, the transaction may be assigned a commit identifier ("commit ID"). The database may be structured such that a read operation of a next transaction may be assigned a read timestamp equal to a commit ID of a previous transaction that was most recently committed to the database. When a transaction performs a read operation from the database, the only other transactions which are visible to the read operation are those transactions which have already been committed prior to the start of the transaction which is executing the read.

In disclosed embodiments, to read a particular document in a transaction, the most recent version of the document which is visible to the transaction is determined. If the most recent visible version of the document is a delta version, then the successive earlier versions of the document are read until a non-delta, i.e., full, version is found. The updates made in the chain of delta versions, up to and including the most recent visible delta update version, can then be applied to the full version to produce a full updated version of the document.

Figure 7:
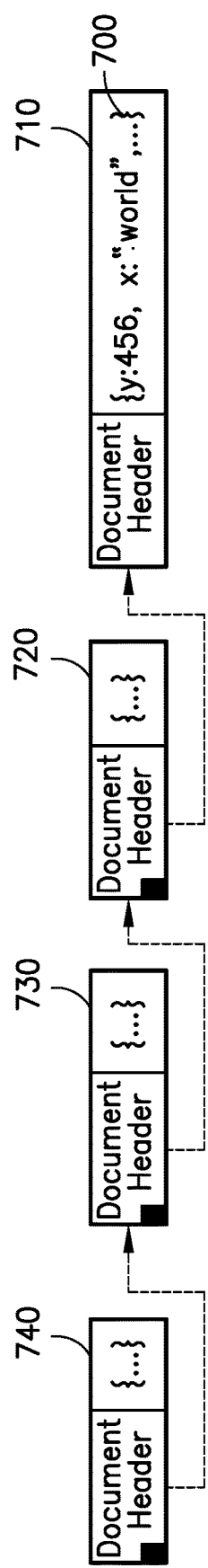
FIG. 7 is a data structure diagram showing a base version of a document and an extended chain of delta versions of the document.

FIG. 7 is a data structure diagram showing a base version 710 of a document 700 and an extended chain of delta versions (720, 730, and 740) of the document. To produce a full updated version of the document 700, a process starts with the most recent visible version (i.e., visible to the transaction being executed), which in this example is a delta update version (e.g., 740). The extended chain of delta versions (720, 730, and 740) is then traversed until the most recent full version is reached (e.g., 710). The changes made in the chain of delta versions (e.g., 720, 730, and 740), up to and including the most recent visible delta update (e.g., 740), can then be applied to the most recent full version (e.g., 710, which is also visible to the transaction since it is earlier) to produce an updated full version of the document. As a chain of delta updates becomes longer, it becomes more difficult to produce the full updated version of the document. Furthermore, in a large chain, some of the transactions may no longer be valid, e.g., due to transactions that have been committed, aborted, etc. In disclosed embodiments, a form of "garbage collection" process may be performed to "clean up" the chain, otherwise, it will take progressively longer to traverse the chain. The garbage collection process may, for example, merge delta update versions which are visible to all transactions into the most recent full update version relative to the delta update versions. In this way, a full update version can be created and the delta update versions can be removed.

Figure 8:
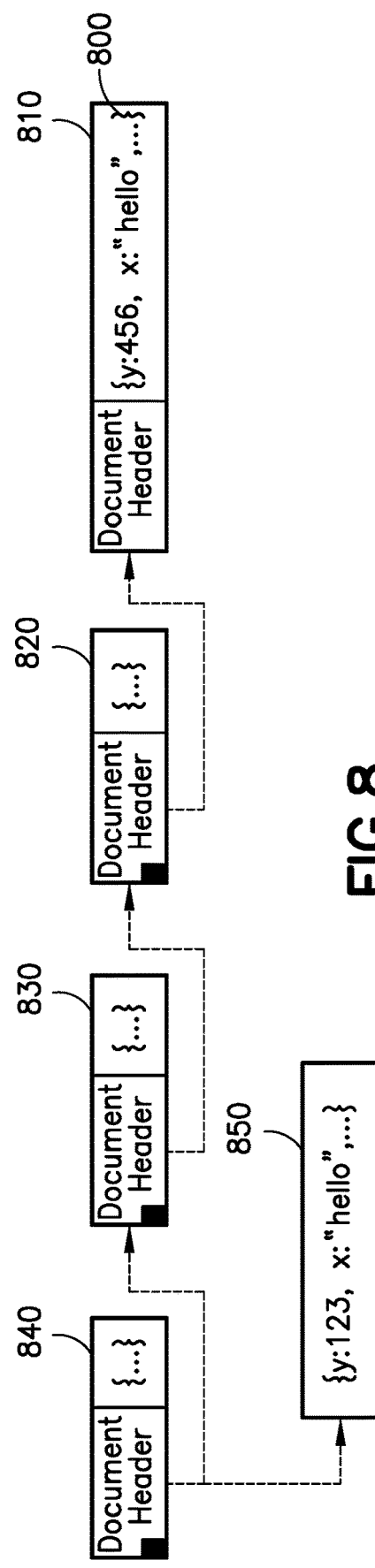
FIG. 8 is a data structure diagram showing a base version of a document, an extended chain of delta versions of the document, and a cached version of the document.

FIG. 8 is a data structure diagram showing a base version 810 of a document 800, an extended chain of delta versions (820, 830, and 840) of the document, and a cached version of the document 850. To produce a full updated version of the document 800, a process starts with the most recent visible version (i.e., visible to the transaction being executed), which in this example is a delta update version (e.g., 840). The chain of versions is then traversed, which is an extended chain of delta update versions (820, 830, and 840), until the most recent full version is reached (e.g., 810). The changes made in the chain of delta versions (e.g., 820, 830, and 840), up to and including the most recent visible delta update (e.g., 840), can then be applied to the most recent full version (e.g., 840, which is also visible to the transaction since it is earlier) to produce an updated full version of the document.

Most new transactions coming into the system would have to follow entire chain, which is time consuming. Therefore, in disclosed embodiments, the most recent full update version of the document is stored as a cached version 850. In such a case, every time an update is done, an operation is performed to merge the update into the cached version 850. Consequently, new transactions (which can generally see all versions) can use the cached full version 850 of the document, without traversing the chain of delta update versions (e.g., 820, 830, and 840). Only older transactions which are not allowed to see the most recent version of the document will have to follow chain and reconstruct what is necessary. This configuration requires more work when each update is done, because the cached version 850 must be updated upon each UPDATE operation. However, all new SELECT, i.e., search, operations coming in can just use the cached version and do not have to traverse chain. In other words, upon an UPDATE operation, the system is not only storing a new delta version of the document, but is also looking at the base version, i.e., most recent full version, and traversing the chain of delta versions to produce and storing a new, full version of the document. In this way, if another UPDATE operation comes in, it is not necessary to traverse the chain—the update is merged into the cached version and the cached version is replaced with this updated version. In disclosed embodiments, a cache exists indefinitely, even though if everything is merged into a single version, e.g., with garbage collection, then a cache would not be needed because it would be the same. However, the cached version is only visible to new transactions, whereas only parts of the chain are visible for older transactions, so the chain and the cache are maintained separately and garbage collection is done separately.

Figure 9:
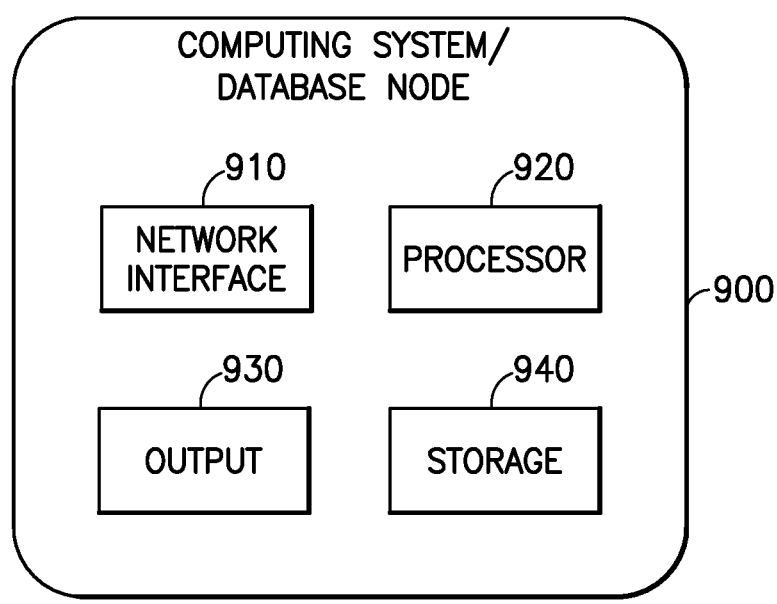
FIG. 9 is a block diagram of a system according to some embodiments.

FIG. 9 is a block diagram of apparatus 900 according to some embodiments. Apparatus 900 may comprise a general-purpose or special-purpose computing apparatus and may execute program code to perform any of the functions described herein. Apparatus 900 may comprise an implementation of one or more elements of system 100. Apparatus 900 may include additional elements which are not shown, according to some embodiments.

Apparatus 900 includes processor 920 operatively coupled to communication device 920, data storage device/memory 930, one or more input devices (not shown), and one or more output devices 930. The network interface 910 may facilitate communication with external devices, such as an application server. Input device(s) may be implemented in the apparatus 900 or in a client device connected via the network interface 910. The input device(s) may comprise, for example, a keyboard, a keypad, a mouse or other pointing device, a microphone, knob or a switch, an infrared (IR) port, a docking station, and/or a touch screen. Input device(s) may be used, for example, to manipulate graphical user interfaces and to input information into apparatus 900. Output device(s) 930 may comprise, for example, a display (e.g., a display screen) a speaker, and/or a printer.

Data storage device/memory 940 may comprise any device, including combinations of magnetic storage devices (e.g., magnetic tape, hard disk drives and flash memory), optical storage devices, Read Only Memory (ROM) devices, Random Access Memory (RAM) etc.

The storage device 940 stores a program and/or platform logic for controlling the processor 920. The processor 920 performs instructions of the programs and thereby operates in accordance with any of the embodiments described herein, including but not limited to the processes.

The programs may be stored in a compressed, uncompiled and/or encrypted format. The programs may furthermore include other program elements, such as an operating system, a database management system, and/or device drivers used by the processor 920 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A data storage and retrieval system for a computer memory, the system comprising:
   a processor programmed to configure the computer memory according to a document store adapted to contain one or more documents, the document store comprising:
   a document data structure comprising a header and a document of the one or more documents, the document including one or more members, each member having an identifier and a value; and
   a chain of two or more differential data structures, each differential data structure comprising a header and at least one updated member, said updated member having a value which is changed relative to a value in a corresponding member having a same identifier in the document data structure,
   wherein a header of all but a first-in-time one of the differential data structures includes a pointer to one preceding differential data structure in the chain, and a flag indicating that the differential data structure does not include all of the members of the document data structure, and
   the processor further programmed to:
   receive a request for the document from a transaction;
   determine a most recent differential data structure in the chain of two or more differential data structures which is visible to the transaction, where one or more of the two or more differential data structures is not visible to the transaction;
   traverse the chain of two or more differential data structures from the most recent differential data structure based on the pointers in the differential data structures until the document data structure is reached; and
   produce a version of the document by updating the members in the document data structure with corresponding updated members of the traversed differential data structures.

2. The system of claim 1, wherein the document store further comprises a cache associated with the document data structure, the cache comprising the members of the document, the processor being further programmed to update the cached members correspondingly with addition of each differential data structure to the chain.

3. The system of claim 2, wherein a header of a most recent one of the differential data structures has a pointer to the cache and, if the most recent differential data structure is visible to a transaction, the processor is further programmed to produce a version of the document by retrieving the cached members.

4. The system of claim 1, wherein the processor is further programmed to replace the document data structure and at least a portion of the chain of differential data structures with a new version of the document data structure by updating the members in the document data structure based on the at least one updated member in the chain of differential data structures, up to and including a most recent differential data member which is visible to all transactions.

5. The system of claim 1, wherein:
   the computer memory is further configured to include a dictionary containing one or more identifiers, each of the identifiers being associated in the dictionary with a value ID; and
   the document data structure comprises at least a first column, the first column being associated with a first identifier of the one or more identifiers, the first column comprising: a value ID of the first identifier, one or more document IDs identifying documents which contains the first identifier, and a set of values associated with the first identifier in the identified documents.

6. A method for storing and retrieving data in a computer system having a computer memory and a processor, the method comprising:
configuring the computer memory according to a document store adapted to contain one or more documents, the document store comprising:
a document data structure comprising a header and a document of the one or more documents, the document including one or more members, each member having an identifier and a value; and
a chain of two or more differential data structures, each differential data structure comprising a header and at least one updated member, said updated member having a value which is changed relative to a value in a corresponding member having a same identifier in the document data structure,
wherein a header of all but a first-in-time one of the differential data structures includes a pointer one preceding differential data structure in the chain, and a flag indicating that the differential data structure does not include all of the members of the document data structure;
receiving a request for the document from a transaction;
determining a most recent differential data structure in the chain of two or more differential data structures which is visible to the transaction, where one or more of the two or more differential data structures is not visible to the transaction;
traversing the chain of two or more differential data structures from the most recent differential data structure based on the pointers in the differential data structures until the document data structure is reached; and
producing a version of the document by updating the members in the document data structure with corresponding updated members of the traversed differential data structures.

7. The method of claim 6, wherein the document store further comprises a cache associated with the document data structure, the cache comprising the members of the document, the method further comprising updating the cached members correspondingly with addition of each differential data structure to the chain.

8. The method of claim 7, wherein a header of a most recent one of the differential data structures has a pointer to the cache and, if the most recent differential data structure is visible to a transaction, the method further comprises producing a version of the document by retrieving the cached members.

9. The method of claim 6, further comprising replacing the document data structure and at least a portion of the chain of differential data structures with a new version of the document data structure by updating the members in the document data structure based on the at least one updated member in the chain of differential data structures, up to and including a most recent differential data member which is visible to all transactions.

10. The method of claim 6, wherein:
the computer memory is further configured to include a dictionary containing one or more identifiers, each of the identifiers being associated in the dictionary with a value ID; and
the document data structure comprises at least a first column, the first column being associated with a first identifier of the one or more identifiers, the first column comprising: a value ID of the first identifier, one or more document IDs identifying documents which contains the first identifier, and a set of values associated with the first identifier in the identified documents.

11. A non-transitory computer-readable storage medium storing program instructions that when executed cause a processor to perform a method for storing and retrieving data in a computer system having a computer memory and a processor, the method comprising:
configuring the computer memory according to a document store adapted to contain one or more documents, the document store comprising:
a document data structure comprising a header and a document of the one or more documents, the document including one or more members, each member having an identifier and a value; and
a chain of two or more differential data structures, each differential data structure comprising a header and at least one updated member, said updated member having a value which is changed relative to a value in a corresponding member having a same identifier in the document data structure,
wherein a header of all but a first-in-time one of the differential data structures includes a pointer to one preceding differential data structure in the chain, and a flag indicating that the differential data structure does not include all of the members of the document data structure;
receiving a request for the document from a transaction;
determining a most recent differential data structure in the chain of two or more differential data structures which is visible to the transaction, where one or more of the two or more differential data structures is not visible to the transaction;
traversing the chain of two or more differential data structures from the most recent differential data structure based on the pointers in the differential data structures until the document data structure is reached; and
producing a version of the document by updating the members in the document data structure with corresponding updated members of the traversed differential data structures.

12. The computer-readable storage medium of claim 11, wherein the document store further comprises a cache associated with the document data structure, the cache comprising the members of the document, the method further comprising updating the cached members correspondingly with addition of each differential data structure to the chain.

13. The computer-readable storage medium of claim 12, wherein a header of a most recent one of the differential data structures has a pointer to the cache and, if the most recent differential data structure is visible to a transaction, the method further comprises producing a version of the document by retrieving the cached members.

14. The computer-readable storage medium of claim 11, further comprising replacing the document data structure and at least a portion of the chain of differential data structures with a new version of the document data structure by updating the members in the document data structure based on the at least one updated member in the chain of differential data structures, up to and including a most recent differential data member which is visible to all transactions.

15. The computer-readable storage medium of claim 11, wherein:

the computer memory is further configured to include a dictionary containing one or more identifiers, each of the identifiers being associated in the dictionary with a value ID; and the document data structure comprises at least a first column, the first column being associated with a first identifier of the one or more identifiers, the first column comprising: a value ID of the first identifier, one or more document IDs identifying documents which contains the first identifier, and a set of values associated with the first identifier in the identified documents.

\* \* \* \* \*